(12) United States Patent
Asthana et al.

(10) Patent No.: US 10,133,896 B2
(45) Date of Patent: Nov. 20, 2018

(54) PAYOFF INFORMATION DETERMINATION (71) Applicant: Hewlett-Packard Development Company, L.P., Houston, TX (US)

(72) Inventors: Prashant Asthana, Bangalore (IN); Rajesh Bhatia, Bangalore (IN); Amrendra Kumar, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/764,704

(22) PCT Filed: Feb. 9, 2016

(86) PCT No.: PCT/US2016/017085
§ 371 (c)(1),
(2) Date: Mar. 29, 2018

(87) PCT Pub. No.: WO2017/078767
PCT Pub. Date: May 11, 2017

(65) Prior Publication Data
US 2018/0293415 A1 Oct. 11, 2018

(30) Foreign Application Priority Data
Nov. 6, 2015 (IN) .................... IN6005/CHE/2015

(51) Int. Cl.
*G06K 7/10* (2006.01)
*H04N 1/32* (2006.01)
(Continued)

(52) U.S. Cl.
CPC ..... *G06K 7/10722* (2013.01); *G06K 9/00469* (2013.01); *H04N 1/00381* (2013.01); *H04N 1/32144* (2013.01); *H04N 2201/3232* (2013.01)

(58) Field of Classification Search
CPC .............................................. G06Q 10/08345
(Continued)

(56) References Cited

U.S. PATENT DOCUMENTS 8,943,582 B1    1/2015   Zhou et al.
9,019,572 B2 *  4/2015   Hasegawa .......... H04N 1/19594
                                                   358/453
(Continued)

FOREIGN PATENT DOCUMENTS

KR    10-2011-0130956 A    12/2011

OTHER PUBLICATIONS

Kumar—"Touch Less Hand Gesture Recognition for Smartphone Applications" . . . Int'l Jml Scientific Engineeting & Technology Research ~ Jun. 2014 ~ 4 pgs.

*Primary Examiner* — Daniel St Cyr
(74) *Attorney, Agent, or Firm* — HP Inc. Patent Department (57) ABSTRACT

An example electronic device includes a watermark scanner to scan a watermark embedded on an initial page of a physical medium. The electronic device also includes a gesture sensor to detect a hand movement of a consumer associated with the physical medium. The electronic device further includes a controller to: determine a page number of the initial page based on the scanned watermark; determine a current page number based on the page number of the initial page; determine a page number of a subsequent page of the physical medium based on the detected hand movement and the current page number; and determine payoff information associated with the subsequent page based on the page number of the subsequent page.

15 Claims, 5 Drawing Sheets

(51) Int. Cl.
*H04N 1/00* (2006.01)
*G06K 9/00* (2006.01)

(58) Field of Classification Search
USPC ........................................ 235/454, 376, 378
See application file for complete search history.

(56) References Cited

U.S. PATENT DOCUMENTS

| | | |
|---|---|---|
| 2007/0130547 A1 | 6/2007 | Boillot |
| 2007/0292026 A1* | 12/2007 | Reznik .................. G06K 9/036 |
| | | 382/176 |
| 2010/0133332 A1 | 6/2010 | Rathus |
| 2013/0168954 A1 | 7/2013 | Koren et al. |
| 2013/0198678 A1 | 8/2013 | Lee et al. |
| 2014/0118800 A1* | 5/2014 | Hwang .............. H04N 1/00331 |
| | | 358/474 |
| 2014/0240799 A1 | 8/2014 | Sakai |
| 2014/0340307 A1 | 11/2014 | Lee et al. |
| 2015/0062558 A1 | 3/2015 | Koppal et al. |
| 2016/0378720 A1* | 12/2016 | Bacus ................... G06F 17/211 |
| | | 715/251 |

\* cited by examiner

PAYOFF INFORMATION DETERMINATION

BACKGROUND

A watermark is information embedded in a medium. For example, a physical watermark can be a pattern or image embedded in a physical medium. As another example, a digital watermark can be bits of information embedded in a digital signal.

BRIEF DESCRIPTION OF THE DRAWINGS

Some examples of the present application are described with respect to the following figures.

DETAILED DESCRIPTION

A watermark can be used to provide payoff information to a consumer of a medium, such as a magazine. Payoff information may be information linked to the watermark that is of interest to the consumer. For example, payoff information may be presented in different formats, such as a video, a uniform resource locator (URL) to a particular website, an advertisement, an image, etc. Payoff information may enable a publisher or content creator to provide an interactive experience to the consumer. To get the payoff information, a consumer may scan a watermark embedded in a page of a magazine using a mobile phone. The payoff information may be displayed on the mobile phone. However, scanning multiple pages can be a tiring and dull experience.

Examples described herein provide an electronic device to determine payoff information based on a hand movement of a consumer of a physical medium. For example, an electronic device may include a watermark scanner to scan a watermark embedded on initial page of a physical medium. The electronic device may also include a gesture sensor to detect a hand movement of a consumer associated with the physical medium. The electronic device may further include a controller to determine a page number of the initial page based on the scanned watermark. The controller may also determine a current page number based on the page number of the initial page. The controller may further determine a page number of a subsequent page of the physical medium based on the detected hand movement and the current page number. The controller may further determine payoff information associated with the subsequent page based on the page number of the subsequent page. In this manner, examples described herein may reduce the burden of scanning multiple pages to get payoff information associated with each page.

Figure 1:
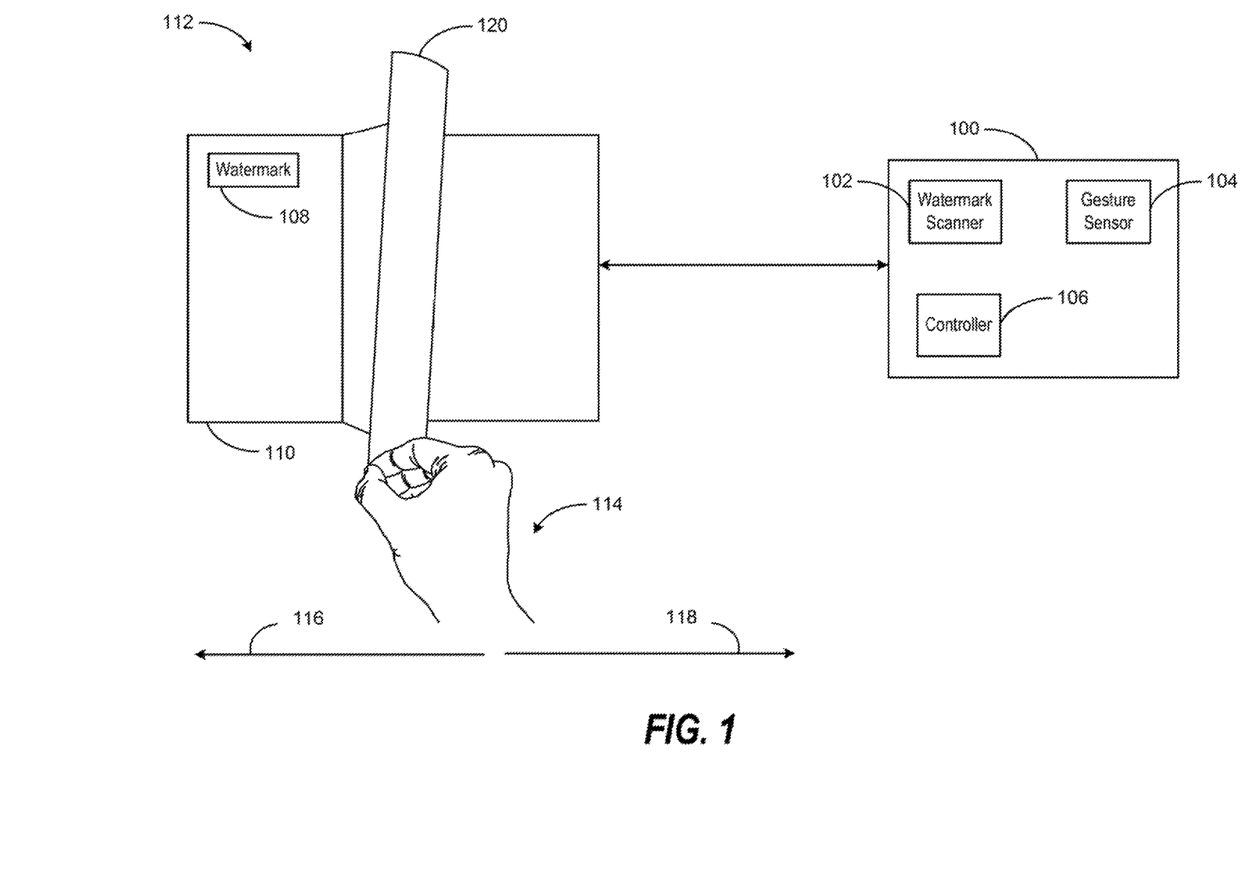
FIG. 1 illustrates an electronic device to determine payoff information associated with a physical medium based on a hand movement of a consumer, according to an example.

FIG. 1 illustrates an electronic device 100 to determine payoff information associated with a physical medium based on a hand movement of a consumer, according to an example. Electronic device 100 may be, for example, a notebook computer, a desktop computer, an all-in-one system, a tablet computing device, a mobile phone, an electronic book reader, or any other electronic device suitable scan a watermark to determine payoff information associated with the watermark.

Electronic device 100 may include a watermark scanner 102, a gesture sensor 104, and a controller 106. Watermark scanner 102 may be any device or circuit to scan a watermark. For example, watermark scanner 102 may be a camera. Gesture sensor 104 may be any device or circuit to detect motion. For example, gesture sensor 104 may detect motion via radio waves (e.g., a radar). As another example, gesture sensor 104 may detect motion via image analysis. Controller 106 may be a central processing unit (CPU), a semiconductor-based microprocessor, and/or other hardware devices suitable for retrieval and execution of instructions stored in a computer-readable storage medium. Controller 106 may control operations of watermark scanner 102 and/or gesture sensor 104.

During operation, a consumer may use watermark scanner 102 to scan a watermark 108 embedded on an initial page of a physical medium 112, such as a page 110. The initial page may be a page of physical medium 112 from which watermark 108 is scanned. Physical medium 112 may include a plurality of pages. Physical medium 112 may be a magazine, a book, or any printed or drawn publication with multiple pages held together. Controller 106 may determine identification information associated with physical medium 112 and a page number of page 110 based on scanned watermark 108. For example, the identification information may include a title of physical medium 112. The page number may indicate the order of page 110 relative to other pages of physical medium 112. For example, the page number may indicate that page 110 is page 1 of physical medium 112. After determining the page number of page 110 (e.g., page 1), controller 106 may set a current page number of physical medium 112 to page 1.

Subsequent to scanning watermark 108, gesture sensor 104 may detect hand movements of the consumer's hand 114 to determine whether a page of physical medium 112 has been flipped and the direction of the page flip. For example, gesture sensor 104 may continuously monitor hand 114 by projecting radio waves onto hand 114. When hand 114 forms a particular gesture and moves in a particular direction, gesture sensor 104 may detect the hand movement and determine that a page flip of physical medium 112 has occurred. Further, gesture sensor 104 may also determine the direction of the page flip based on the hand movement. For example, when thumb and index finger of hand 114 form a pinching gesture and hand 114 moves in a first direction (as indicated by an arrow 116), gesture sensor 104 may determine a page flip has occurred and the direction of the page flip is to the first direction. As another example, when thumb and index finger of hand 114 form a pinching gesture and hand 114 moves in a second direction (as indicated by an arrow 118) opposite to the first direction, gesture sensor 104 may determine a page flip has occurred and the direction of the page flip is to the second direction.

Controller 106 may determine a page number of a subsequent page of physical medium 112, such as a page 120 of physical medium 112, based on the detected page flip(s) and the current page number (e.g., the page number of page 110). A subsequent page may be a page of physical medium 112 that is open after watermark 108 is scanned. For example, when gesture sensor 104 detects a page flip to the first direction, controller 106 may increase the current page number by an increment to determine the page number of page 120. Controller 106 may increase the current page number by a particular increment for each detected page flip to the first direction.

For example, controller 106 may increase the current page number by an increment of 1 and set the page number of page 120 to the current page number (i.e., 2) when a single page flip to the first direction is detected. Thus, controller 106 may determine that the page number of page 120 is page 2. As another example, controller 106 may increase the current page number by two increments of 1 to determine that the page number of page 120 is page 3 when two page flips to the first direction are detected. In response to determining the page number of page 120, payoff information associated with page 120 may be displayed at electronic device 100. Displaying the payoff information is described in more detail in FIG. 2.

When gesture sensor 104 detects a page flip to the second direction, controller 106 may decrease the current page number by a decrement to determine a page number of a subsequent page. For example, controller 106 may decrease the current page number by a decrement of 1 for each detected page flip to the second direction. As an example, the current page number may be page 2, which indicates that page 120 is open. When gesture sensor 104 detects a single page flip to the second direction, controller 106 may decrease the current page number by a decrement of 1 to determine the page number of page 110. As another example, the current page number may be page 5. When gesture sensor 104 detects two page flips to the second direction, controller 106 may decrease the current page number by two decrements of 1 to determine the page number of a subsequent page is 3.

In some examples, when both sides of a single page have distinct page numbers (e.g., a first side of page 120 is page 2 and a second side of page 120 is page 3), each increment or decrement may correspond to a plural number. For example, when the page number of page 110 is 1 and a single page flip to the first direction is detected, controller 106 may increase the current page number by an increment of 2 to determine the page number of page 120 to be 3. Thus, the page number of page 120 is 3. As another example, page 120 may be open and the page number of page 120 is 3, when a single page flip to the second direction is detected, controller 106 may decrease the current page number by a decrement of 2 to determine the page number of page 110 to be In some examples, a user of electronic device 100 may calibrate gesture sensor 104 to recognize hand movements associated with page flips during a training sequence. For example, the user may program gesture sensor 104 to associate a first hand movement to a first direction of a page flip. The user may also program gesture sensor 104 to associate a second hand movement to a second direction of the page flip.

Figure 2:
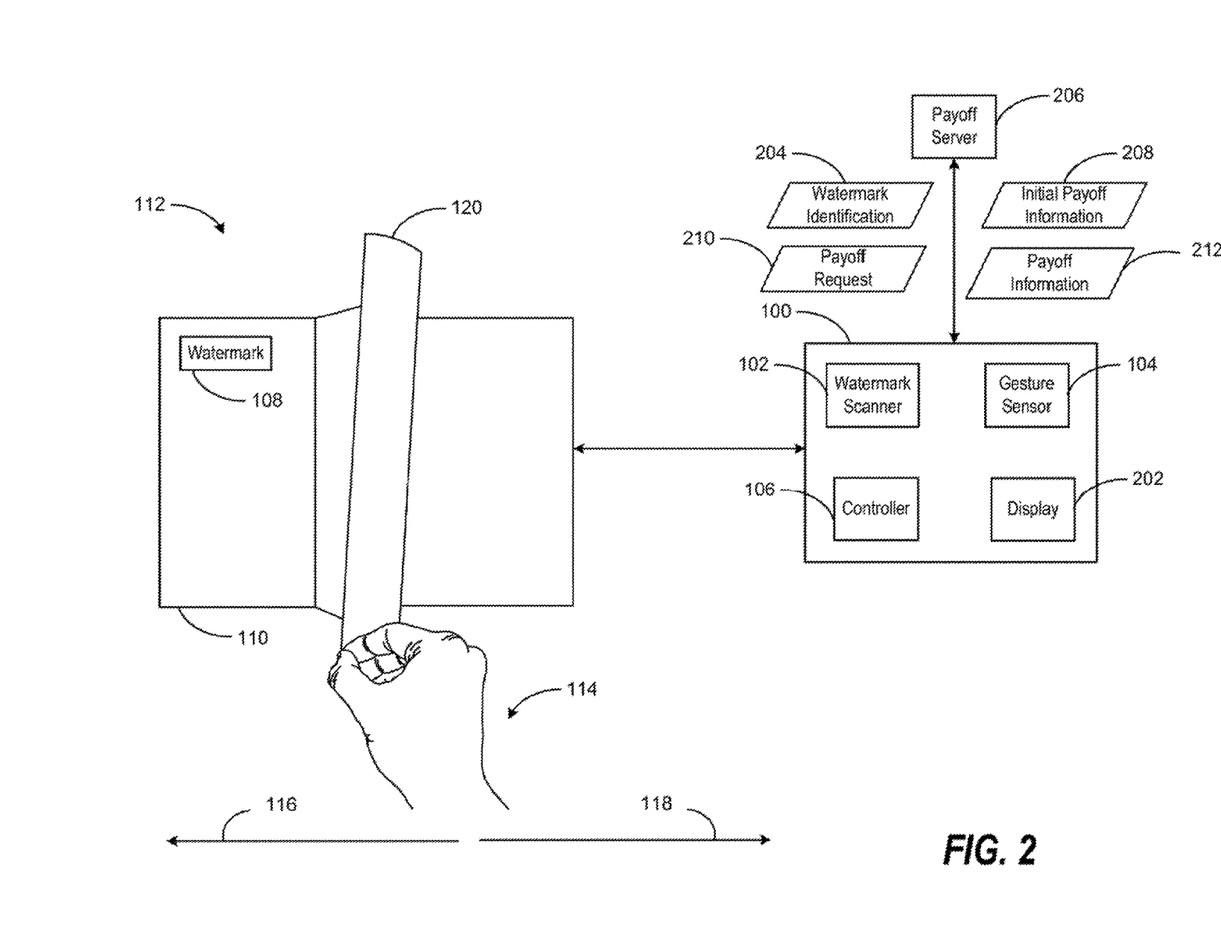
FIG. 2 illustrates an electronic device to determine payoff information associated with a physical medium based on a hand movement of a consumer, according to another example.

FIG. 2 illustrates electronic device 100 to determine payoff information associated with a physical medium based on a hand movement of a consumer, according to another example. Electronic device 100 may include a display 202 to display payoff information associated with page(s) of physical medium 112. Display 202 may be, for example, a liquid crystal display, an organic light-emitting diode display, or any device or circuit to present information visually. In some examples, the payoff information may be displayed in a graphical user interface (GUI) in display 202.

During operation, in response to scanning watermark 108, controller 106 may extract a watermark identification 204 from watermark 108. In some examples, controller 106 may decode watermark identification 204 to determine identification information associated with physical medium 112 and a page number of an initial page (e.g., page 110). In some examples, controller 106 may transmit watermark identification 204 to a payoff server 206 to determine payoff information associated with watermark 108. Payoff server 206 may decode watermark identification 204 to determine initial payoff information 208 that includes the identification information associated with physical medium 112 and the page number of the initial page. Payoff server 206 may transmit initial payoff information 208 to electronic device 100.

In response to receiving initial payoff information 208, electronic device 100 may set the current page number based on initial payoff information 208. When a page flip is detected, controller 106 may determine the page number of a subsequent page as described in FIG. 1. Controller 106 may transmit a payoff request 210 to payoff server 206 to determine payoff information 212 associated with the subsequent page. Payoff request 210 may include the current page number and the identification information of physical medium 112. In response to receiving payoff request 210, payoff server 206 may determine payoff information 212. Payoff server 206 may transmit payoff information 212 to electronic device 100. In response to receiving payoff information 212, electronic device 100 may display payoff information 212 via display 202.

Figure 3:
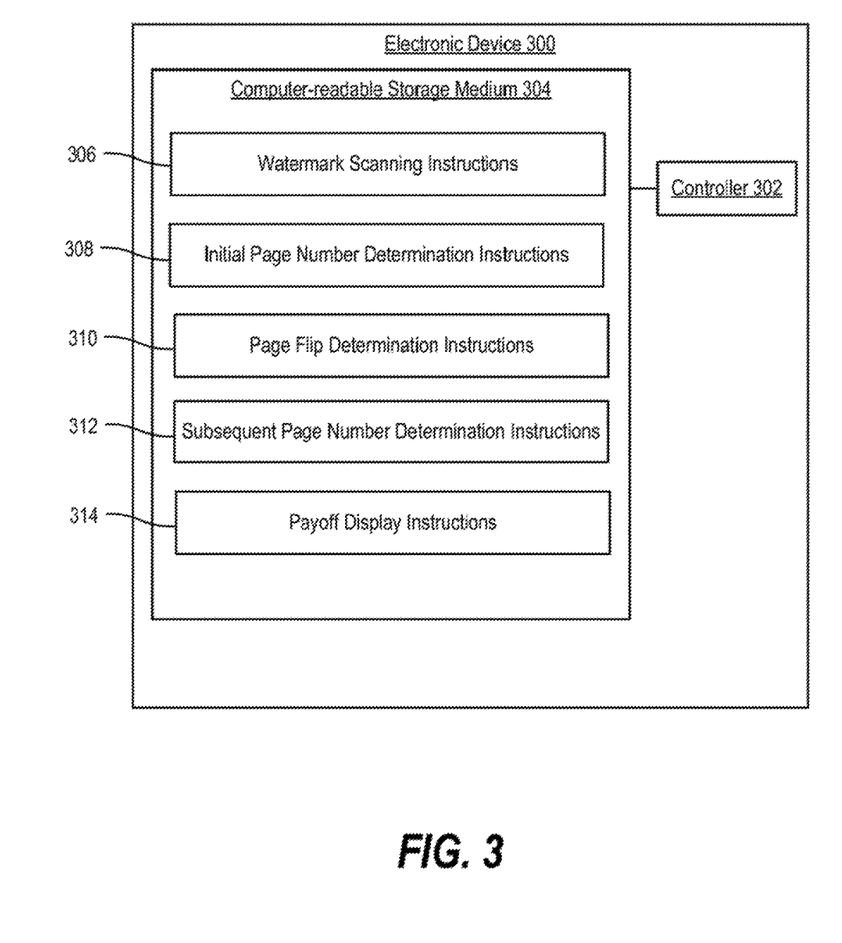
FIG. 3 illustrates an electronic device to determine payoff information associated with a physical medium based on a hand movement of a consumer, according to another example.

FIG. 3 illustrates an electronic device 300 to determine payoff information associated with a physical medium based on a hand movement of a consumer, according to another example. Electronic device 300 may implement electronic device 100 of FIGS. 1-2. Electronic device 300 may include a controller 302 and a computer-readable storage medium 304.

Controller 302 may implement controller 106 of FIG. 1. Controller 302 may be a central processing unit (CPU), a semiconductor-based microprocessor, and/or other hardware devices suitable for retrieval and execution of instructions stored in computer-readable storage medium 304. Controller 302 may fetch, decode, and execute instructions 306, 308, 310, 312, 314, or a combination thereof to: scan a watermark from an initial page of a physical medium, such as physical medium 112 of FIG. 1; determine the page number of the initial page; detect page flip(s) associated with the physical medium; determine page number of a subsequent page based on the detect page flip(s); and display payoff information associated with the subsequent page. As an alternative or in addition to retrieving and executing instructions, controller 302 may include at least one electronic circuit that includes electronic components for performing the functionality of instructions 306, 308, 310, 312, 314, or a combination thereof.

Computer-readable storage medium 304 may be any electronic, magnetic, optical, or other physical storage device that contains or stores executable instructions. Thus, computer-readable storage medium 304 may be, for example, Random Access Memory (RAM), an Electrically Erasable Programmable Read-Only Memory (EEPROM), a storage device, an optical disc, etc. In some examples, computer-readable storage medium 304 may be a non-transitory storage medium, where the term "non-transitory" does not encompass transitory propagating signals. Computer-readable storage medium 304 may be encoded with a series of processor executable instructions 306, 308, 310, 312, and 314.

Watermark scanning instructions 306 may scan a watermark on a physical medium. For example, referring to FIG. 1, watermark scanner 102 may scan a watermark 108 embedded on an initial page of physical medium 112. Page number determination instructions 308 may determine a page number of a page of a physical medium. For example, referring to FIG. 1, controller 106 may determine identification information associated with physical medium 112 and a page number of page 110 based on scanned watermark 108 based on watermark 108.

Page flip determination instructions 310 may detect a page flip associated with a physical medium and a direction of the page flip. For example, referring to FIG. 1, subsequent to scanning watermark 108, gesture sensor 104 may detect hand movements of the consumer's hand 114 to determine whether a page of physical medium 112 has been flipped and the direction of the page flip. Initial page number determination instructions 312 may determine the page number of an initial page of a physical medium. For example, referring to FIG. 1, gesture sensor 104 may continuously monitor hand 114 by projecting radio waves onto hand 114. When hand 114 is a particular and moves in a particular fashion, gesture sensor 104 may detect the hand movement and determine that a page flip of physical medium 112 has occurred.

Subsequent page number determination instructions may determine a page number of a subsequent page of the physical medium. For example, referring to FIG. 1, controller 106 may determine a page number of a subsequent page of physical medium 112, such as a page 120 of physical medium 112, based on the detected page flip(s) and the current page number (e.g., the page number of page 110). Payoff display instructions 314 may display payoff information associated with a page. For example, referring to FIG. 2, in response to receiving payoff information 212, electronic device 100 may display payoff information 212 via display 202.

Figure 4:
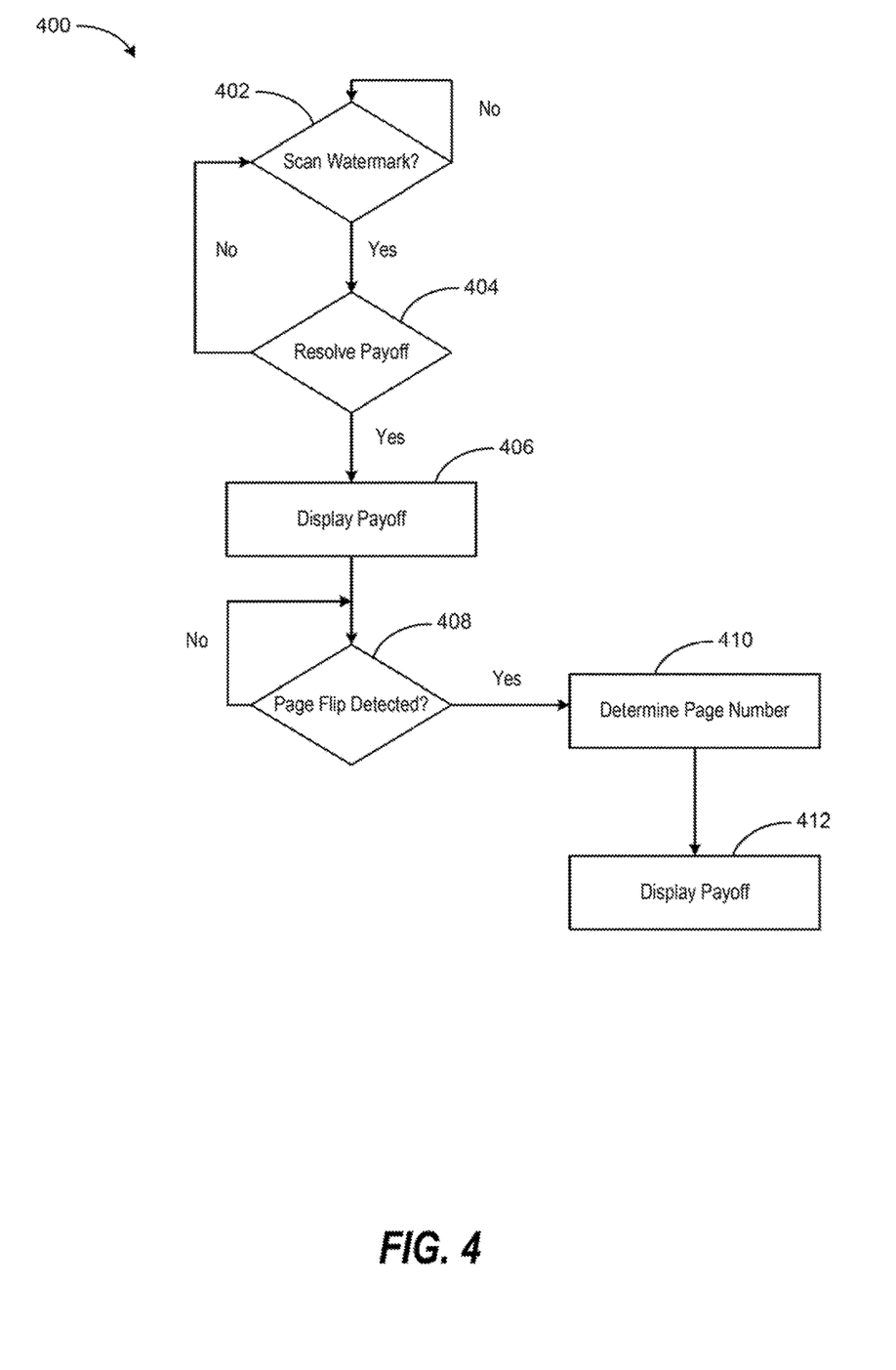
FIG. 4 illustrates a method of operation at an electronic device to determine payoff information associated with a physical medium based on a hand movement of a consumer, according to an example.

FIG. 4 illustrates a method 400 of operation at an electronic device to determine payoff information associated with a physical medium based on a hand movement of a consumer, according an example. Although method 400 is described with reference to electronic device 100, it should be understood that method 400 may be implemented using electronic device 100 of FIGS. 1-2 and/or electronic device 300 of FIG. 3. At 402, electronic device 100 may determine if a watermark has been scanned in from a page of a physical medium, such as watermark 108 of FIG. 1. In response to a determination that a watermark has been scanned into electronic device 100 (e.g., via watermark scanner 102), electronic device 100 may resolve payoff information associated with the watermark, at 404. Electronic device 100 may resolve the payoff information by retrieving the payoff information from a payoff server, such as payoff server 206. The payoff information may include identification information of the physical medium and a page number of the initial page where the watermark is located. The payoff information may also include a video, a URL to a particular website, an advertisement, an image, or other content that is associated with the watermark. Electronic device 100 may display the payoff information, for example, via a GUI in a display of electronic device 100, at 406.

Electronic device 100 may determine if a page of the physical medium has been flipped and the direction of the page flip, at 408. When a page flip has been detected (e.g., via gesture sensor 104), electronic device 100 may determine a page number of a subsequent page of the physical medium based on the detected page flip and the direction of the detected page flip, at 410. Electronic device 100 may display payoff information associated with the subsequent page, at 412.

Figure 5:
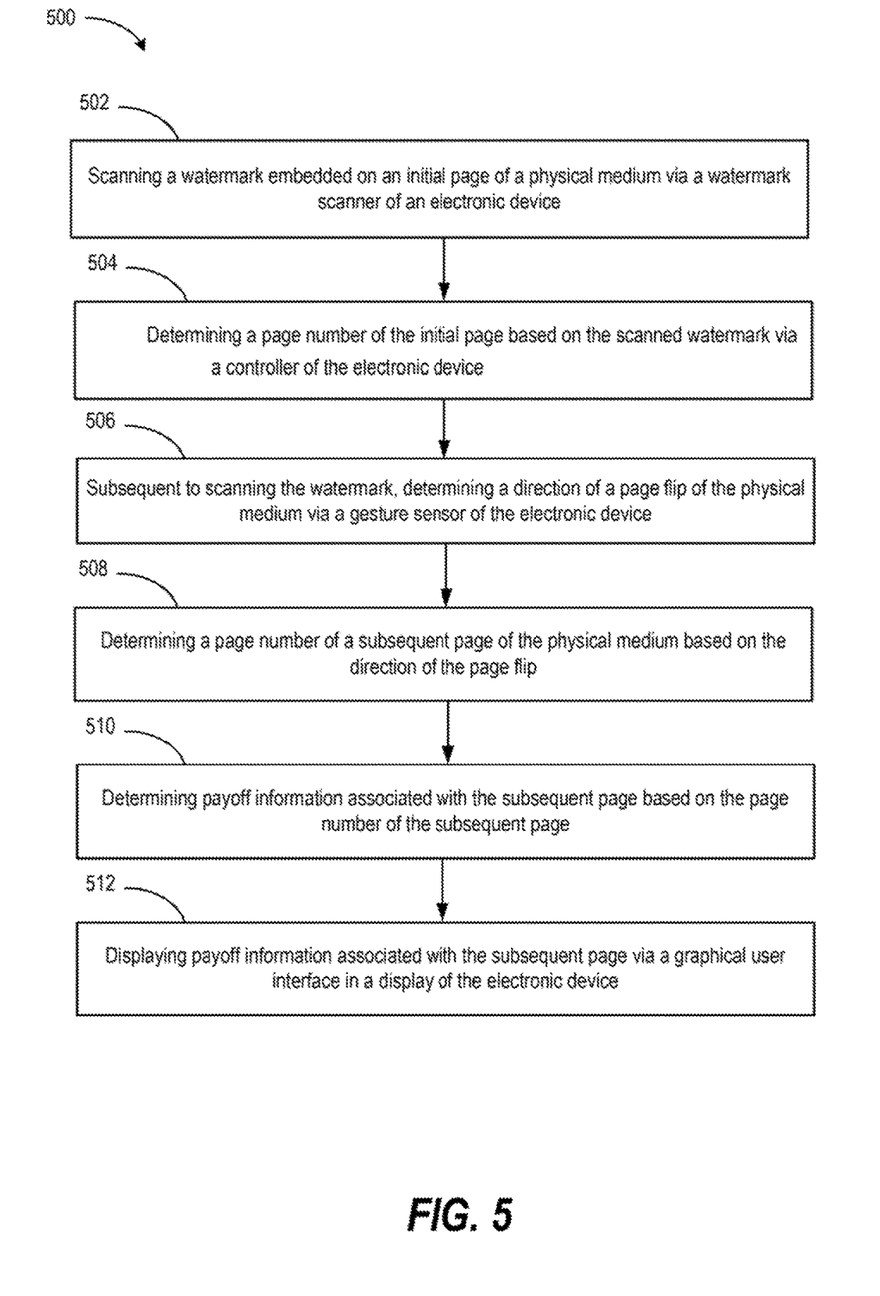
FIG. 5 illustrates a method of operation at an electronic device to determine payoff information associated with a physical medium based on a hand movement of a consumer, according to another example.

FIG. 5 illustrates a method 500 of operation at an electronic device to determine payoff information associated with a physical medium based on a hand movement of a consumer, according to another example. Method 500 be implemented using electronic device 100 of FIGS. 1-2 and/or electronic device 300 of FIG. 3. Method 500 includes scanning a watermark embedded on an initial page of a physical medium via a watermark scanner of an electronic device, at 502. For example, referring to FIG. 1, a consumer may use watermark scanner 102 to scan a watermark 108 embedded on an initial page of a physical medium 112, such as a page 110.

Method 500 also includes determining a page number of the initial page based on the scanned watermark via a controller of the electronic device, at 504. For example, referring to FIG. 1, controller 106 may determine identification information associated with physical medium 112 and a page number of page 110 based on scanned watermark 108 based on watermark 108.

Method 500 further includes, subsequent to scanning the watermark, determining a direction of a page flip of the physical medium via a gesture sensor of the electronic device, at 506. For example, referring to FIG. 1, Subsequent to scanning watermark 108, gesture sensor 104 may detect hand movements of the consumer's hand 114 to determine whether a page of physical medium 112 has been flipped and the direction of the page flip.

Method 500 further includes determining a page number of a subsequent page of the physical medium based on the direction of the page flip, at 508. For example, referring to FIG. 1, controller 106 may increase the current page number by an increment of 1 and set the page number of page 120 to be the current page number (i.e., 2) when a single page flip to the first direction is detected. Thus, controller 106 may determine that the page number of page 120 is page 2.

Method 500 further includes determining payoff information associated with the subsequent page based on the page number of the subsequent page, at 510. For example, referring to FIG. 2, controller 106 may transmit a payoff request 210 to payoff server 206 to determine payoff information associated with the current page.

Method 500 further includes displaying payoff information associated with the subsequent page via a graphical user interface in a display of the electronic device, at 512. For example, referring to FIG. 2, in response to receiving payoff information 212, electronic device 100 may display payoff information 212 via display 202.

The use of "comprising", "including" or "having" are synonymous and variations thereof herein are meant to be inclusive or open-ended and do not exclude additional unrecited elements or method steps.

What is claimed is:
1. An electronic device comprising:
a watermark scanner to scan a watermark embedded on an initial page of a physical medium;
a gesture sensor to detect a hand movement of a consumer associated with the physical medium; and a controller to:
    determine a page number of the initial page based on the scanned watermark;
    determine a current page number based on the page number of the initial page;
    determine a page number of a subsequent page of the physical medium based on the detected hand movement and the current page number; and
    determine payoff information associated with the subsequent page based on the page number of the subsequent page.

2. The electronic device of claim 1, wherein the gesture sensor is to detect the hand movement via radio waves.

3. The electronic device of claim 1, further comprising a display to display the payoff information.

4. The electronic device of claim 1, wherein the controller is to determine identification information of the physical medium based on the watermark.

5. The electronic device of claim 1, wherein the gesture sensor is further to:
    associate a first hand movement to a first direction of a page flip; and
    associate a second hand movement to a second direction of the page flip.

6. The electronic device of claim 1, wherein the watermark scanner is a camera.

7. A non-transitory computer-readable storage medium comprising instructions that when executed cause a controller of an electronic device to:
    scan a watermark embedded on an initial page of a physical medium via a watermark scanner;
    determine a page number of the initial page based on the scanned watermark;
    in response to determining the page number, determine a direction of a page flip of the physical medium via a gesture sensor;
    determine a page number of a subsequent page of the physical medium based on the direction of the page flip; and
    determine payoff information associated with the subsequent page.

8. The non-transitory computer-readable storage medium of claim 7, wherein the instructions when executed further cause the controller to:
    determine a current page number based on the page number of the initial page; and
    update the current page number to the page number of the subsequent page.

9. The non-transitory computer-readable storage medium of claim 7, wherein the payoff information is displayed via a graphical user interface at the electronic device.

10. The non-transitory computer-readable storage medium of claim 7, wherein the instructions when executed further cause the controller to:
    extract a watermark identification from the watermark;
    transmit the watermark identification to a payoff server; and
    receive the page number of the initial page from a payoff server.

11. A method comprising:
    scanning a watermark embedded on an initial page of a physical medium via a watermark scanner of an electronic device;
    determining a page number of the initial page based on the scanned watermark via a controller of the electronic device;
    subsequent to scanning the watermark, determining a direction of a page flip of the physical medium via a gesture sensor of the electronic device;
    determining a page number of a subsequent page of the physical medium based on the direction of the page flip;
    determining payoff information associated with the subsequent page based on the page number of the subsequent page; and
    displaying payoff information associated with the subsequent page via a graphical user interface in a display of the electronic device.

12. The method of claim 11, further comprising:
    extracting a watermark identification from scanned watermark;
    transmitting the watermark identification to a payoff server; and
    receiving the page number of the initial page from the payoff server.

13. The method of claim 11, further comprising:
    associate a first hand movement to a first direction of a page flip; and
    associate a second hand movement to a second direction of the page flip.

14. The method of claim 11, further comprising determining identification information of the physical medium based on the watermark.

15. The method of claim 11, wherein the direction of the page flip is determined based on a hand movement.

* * * * *